United States Patent
Montanaro et al.

(10) Patent No.: US 8,738,499 B2
(45) Date of Patent: May 27, 2014

(54) BINARY OPTIONS ON AN ORGANIZED EXCHANGE AND THE SYSTEMS AND METHODS FOR TRADING THE SAME

(75) Inventors: Donato A. Montanaro, Fort Lauderdale, FL (US); Michael T. Bickford, Basking Ridge, NJ (US); Jeffrey P. Burns, Berkeley Heights, NJ (US); Christopher P. Masciale, Westfield, NJ (US); Scott R. Ebner, London (GB)

(73) Assignee: NYSE MKT LLC, New York, NY (US)

( * ) Notice: Subject to any disclaimer, the term of this patent is extended or adjusted under 35 U.S.C. 154(b) by 2571 days.

(21) Appl. No.: 11/017,191

(22) Filed: Dec. 21, 2004

(65) Prior Publication Data

US 2005/0165669 A1    Jul. 28, 2005

Related U.S. Application Data

(60) Provisional application No. 60/560,732, filed on Jan. 22, 2004, provisional application No. 60/583,347, filed on Jun. 29, 2004.

(51) Int. Cl.
*G06Q 40/00* (2012.01)

(52) U.S. Cl.
USPC ............................. 705/37; 705/35; 705/36 R (58) Field of Classification Search
USPC ....................................................... 705/35–37
See application file for complete search history.

(56) References Cited

U.S. PATENT DOCUMENTS

| | | | |
|---|---|---|---|
| 4,823,265 A * | 4/1989 | Nelson | 705/35 |
| 6,304,858 B1 | 10/2001 | Mosler et al. | |
| 6,321,212 B1 | 11/2001 | Lange | |
| 6,347,307 B1 * | 2/2002 | Sandhu et al. | 705/36 R |
| H0002064 H * | 5/2003 | Buchalter | 705/37 |
| 6,876,982 B1 * | 4/2005 | Lancaster | 705/37 |
| 7,020,632 B1 * | 3/2006 | Kohls et al. | 705/37 |
| 7,225,153 B2 * | 5/2007 | Lange | 705/37 |
| 7,409,367 B2 * | 8/2008 | McGill et al. | 705/37 |
| 7,519,554 B2 * | 4/2009 | Gogol et al. | 705/36 R |
| 7,685,054 B2 * | 3/2010 | Nordlicht et al. | 705/37 |
| 7,742,972 B2 * | 6/2010 | Lange et al. | 705/37 |
| 7,856,395 B2 * | 12/2010 | Jackson et al. | 705/37 |
| 7,996,296 B2 * | 8/2011 | Lange | 705/37 |
| 8,224,742 B2 * | 7/2012 | Gogol et al. | 705/37 |
| 8,229,840 B2 * | 7/2012 | Jackson et al. | 705/37 |
| 8,438,102 B2 * | 5/2013 | Gogol et al. | 705/37 |
| 2002/0010670 A1 * | 1/2002 | Mosler et al. | 705/37 |
| 2003/0028468 A1 * | 2/2003 | Wong et al. | 705/37 |
| 2003/0033212 A1 * | 2/2003 | Sandhu et al. | 705/26 |
| 2003/0097328 A1 * | 5/2003 | Lundberg et al. | 705/37 |
| 2003/0110107 A1 * | 6/2003 | Hiatt et al. | 705/35 |
| 2003/0115128 A1 * | 6/2003 | Lange et al. | 705/37 |
| 2004/0098330 A1 * | 5/2004 | Fraivillig et al. | 705/36 |
| 2004/0103127 A1 * | 5/2004 | Bjornson et al. | 708/160 |

(Continued)

*Primary Examiner* — Narayanswamy Subramanian
(74) *Attorney, Agent, or Firm* — Buckley, Maschoff & Talwalkar LLC (57) ABSTRACT

Financial systems and methods for trading fixed return options on secondary markets such as stock exchanges including an electronic order delivery and execution system and/or an on-floor trading auction, configured to provide an exchange-traded environment. Also included is at least one fixed return option or binary option traded through an exchange's order delivery and execution system or on-floor trading auction, whereby such trading environment provides an open market. Also included are methods for calculating the closing settlement value for securities underlying fixed return options or binary options in order to maintain a fair and orderly trading environment for these instruments on an organized exchange.

3 Claims, 6 Drawing Sheets

(56) References Cited

U.S. PATENT DOCUMENTS

| | | | |
|---|---|---|---|
| 2005/0060255 A1* | 3/2005 | Heaton | 705/37 |
| 2005/0216384 A1* | 9/2005 | Partlow et al. | 705/35 |
| 2006/0036531 A1* | 2/2006 | Jackson et al. | 705/37 |
| 2006/0041435 A1* | 2/2006 | Knorr | 705/1 |
| 2009/0063358 A1* | 3/2009 | Smith | 705/36 R |
| 2011/0087586 A1* | 4/2011 | Jackson et al. | 705/37 |
| 2012/0022995 A1* | 1/2012 | Lange | 705/37 |
| 2012/0221456 A1* | 8/2012 | Lutnick et al. | 705/37 |

\* cited by examiner

Figure 1. Linear payoff

Figure 2. Non-Linear payoff

Figure 3. European Style Binary Option

BINARY OPTIONS ON AN ORGANIZED EXCHANGE AND THE SYSTEMS AND METHODS FOR TRADING THE SAME

CROSS REFERENCE TO RELATED APPLICATIONS

This application claims the benefit of priority to U.S. Provisional Patent Applications Ser. No. 60/560,732, filed Jan. 22, 2004, and 60/583,347, filed Jun. 29, 2004.

BACKGROUND

An option is a contract that represents the right to buy (call option) or sell (put option) a specified amount of an underlying security at a predetermined fixed price within a specified time period. The underlying securities typically are shares of stock or exchange-traded funds, securities indexes, bonds or foreign currencies. The fixed price or "strike price" is the price at which the underlying security can be purchased, in the case of a call option, or sold, in the case of a put option.

The purchaser or holder of an option pays a premium for the right but not the obligation, to exercise the option contract. At expiration, the option becomes worthless. Option sellers assume a legal obligation under the option contracts to fulfill the contracts if the options are assigned to them, whereas the premiums are the extent of the potential risk to option buyers. Options lose value with time—known as "time decay"—which is priced into the premium amount paid by the purchaser.

Options can be used in a variety of ways to profit from a rise or fall in the market. Buying an option offers limited risk and unlimited profit potential. Selling or writing an option, however, provides an obligation to perform if the party purchasing the option chooses to exercise. Selling or writing an option therefore presents the seller with limited profit potential and significant risk unless the position is properly hedged. Sellers or writers of options typically expect the price of the underlying security to remain flat or move in the desired direction. In return for their obligations, the writers receive an upfront cash payment or premium from the buyers.

Options are traded on securities and commodities exchanges and through the over-the-counter ("OTC") market. With respect to the trading of options on exchanges, the securities exchanges generally list and trade options on stocks, exchange-traded funds ("ETFs"), bonds, trust issued receipts, other securities and foreign currencies. Commodity exchanges generally list and trade futures contracts and options on futures contracts. Options directly based on an underlying security or securities are solely listed and traded on securities exchanges.

Standardized terms for exchange-traded securities options include size, expiration date, exercise style and exercise or strike price. The creation of the Options Clearing Corporation ("OCC") when standardized securities options trading commenced in 1973 virtually eliminated counterparty risk (i.e., the risk that the other party will breach the contract). OCC is the sole issuer and financial guarantor of all securities options traded by U.S. securities exchanges. In connection with the mechanics of listing standardized options contracts, the OCC together with the U.S. options exchanges have developed a nomenclature for describing different options as "options classes" or "options series." The term "option class" means all option contracts of the same type of contract covering the same underlying security. The term "options series" means all options of the same class listing identical terms, including the same expiration month.

There are two types of standardized or exchange-traded options—calls and puts. A call option gives the holder the right, but not the obligation, to buy a specified amount of an underlying security at a specified price within a specified time period in exchange for a premium amount. The buyer of a call option hopes the price of the underlying security rises by the call's expiration date, while the seller hopes that the price of the underlying security remains flat or decreases.

A put option gives the holder the right, but not the obligation, to sell a specified amount of an underlying security at a specified price within a specified time period in exchange for a premium amount. The buyer of a put option hopes the price of the underlying stock decreases by the expiration date, while the seller hopes the price of the underlying security remains flat or increases.

The strike price is the fixed price of the option contract at which the underlying security can be purchased (call) or sold (put) at any time prior to the option's expiration date if the option is exercised. The expiration date designates the last day on which an option may be exercised. Standardized or exchange-traded options typically permit two (2) types of exercise: (i) American-style and (ii) European-style. American-style options can be exercised at any time prior to expiration while European-style can be exercised only on the expiration date. Exchange-traded options have an expiration month and generally expire on the third Saturday of the expiration month. A third form of exercise, which is occasionally used with over-the-counter ("OTC") options, is Bermudan exercise. The Bermuda-style option can be exercised on several designated dates prior to expiration.

The premium amount represents the actual price an investor pays to purchase an option or receives for selling an option. The "bid" is the highest price a potential buyer will pay for the option while the "ask" is the lowest price acceptable to a potential seller. The "ask" and "bid" prices are known as "quotes," which are disseminated by the options exchanges through the Options Price Reporting Authority ("OPRA") with the difference between the bid and ask known as the "bid-ask spread."

The pricing of options contracts is complex. The groundwork for the process of calculating a price for an option is set forth in the Black-Scholes Options Pricing Model (See Black, F. & Scholes, M. (1973). *The Pricing of Options and Corporate Liabilities*," Journal of Political Economy, 81, 637-654). Although developed in the early 1970's, this pricing model remains the basic pricing framework for option practitioners. In subsequent years, several variations from the Black-Scholes Options Pricing Model have been developed to directly address varying assumptions and scenarios. The major components affecting the price or premium are the current price of the underlying security, the type of option, the strike price compared to the current market price of the underlying security, the amount of time remaining to expiration, the volatility of the underlying security and interest rates.

The premium amount is generally the intrinsic value (strike price minus current value of the underlying security) plus time value. The intrinsic value of an option measures the amount that the option is "in-the-money" as compared to the strike price. The intrinsic value of a call option is thus the market price of the underlying securities minus the strike price of the option, and the intrinsic value of a put option is the strike price minus the market price. The time value portion of the premium depends on the volatility of the underlying security. Volatility is a measure of the amount by which an underlying security is expected to fluctuate in a given period of time. Options of stocks that are volatile generally require a higher premium due to the greater inherent risk.

Option contracts are a form of derivative instrument. A derivative instrument or derivative is a financial instrument which derives its value from the value of some other asset or variable. For example, a stock option is a derivative because it derives its value from the value of an underlying stock.

Derivatives are known or divided into two (2) types: plain vanilla and exotic. Plain vanilla derivatives generally provide for simple structures, while exotic derivatives generally provide for more complicated structures that are specifically tailored to an individual need, strategy, or situation. Accordingly, plain vanilla derivatives are typically more common and represent a greater share of the derivatives marketplace as compared to exotics.

Figure 1:
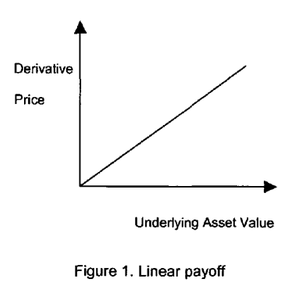
FIG. 1 is a graph illustrating a linear payoff relation between the price of an option and the value of the underlying security.
Figure 2:
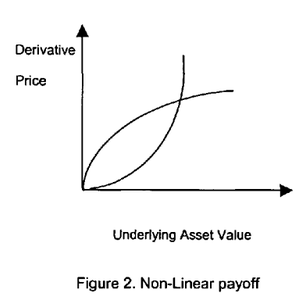
FIG. 2 is a graph illustrating non-linear payoff relations between the price of an option and the value of the underlying security.
Figure 3:
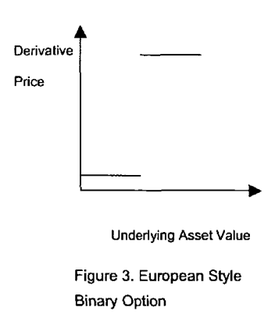
FIG. 3 is a graph illustrating a binary payoff relationship between the price of an option and the value of the underlying security.

Derivative instruments are further categorized in various ways. One distinction is between linear and non-linear derivatives. The former have payoff amounts that behave like a line, as shown in FIG. 1. The latter have payoff diagrams with curvature, either convex or concave, as shown in FIG. 2, or have more complex payoff diagrams, such as that shown in FIG. 3. In addition, a non-linear derivative may have gaps in the payoff profile.

Certain derivatives provide for the purchase or sale of an underlying asset. A typical standardized or exchange-traded option contract in the United States represents the right to purchase or sell 100 shares of an underlying asset. This type of option is typically said to have a multiplier of 100, i.e., the actual purchase price is determined from the quoted price multiplied by 100.

There is also variation in the method for settling option transactions. Options may be settled by delivery of the underlying asset ("physical settlement") or by delivery of the cash value amount ("cash settlement"). A derivative instrument is physically settled if the underlying asset is to be delivered in exchange for a specified payment.

With cash settlement, the underlying asset is not physically delivered. Instead, the derivative settles for an amount of money equal to what the derivative's market value would be at maturity/expiration if it were a physically settled derivative (i.e. the intrinsic value), or for some other cash value determined by an agreed-upon method.

Certain types of derivatives are routinely cash-settled because physical delivery would be inconvenient or impossible. For example, an option on a portfolio or index of stocks, such as the S&P 500, will generally be cash-settled for convenience. An option on an interest rate must be cash-settled because an interest rate cannot be physically delivered.

One style of "exotic option" which is typically cash-settled is a binary option. Binary options (also known as a "digital options") have a discontinuous or non-linear payoff, like that shown in FIG. 3. There are many forms, but the two most basic are: (1) cash-or-nothing and (2) asset-or-nothing. Binary options can be European or American exercise style and can be structured as calls or puts.

A European cash-or-nothing binary pays a fixed amount of cash only if it expires in-the-money. For example, a European cash-or-nothing call makes a fixed payment if the option expires with the underlying asset above the strike price. It pays zero (0) if it expires with the underlying asset equal to or less than the strike price. The value of the payoff is not affected by the magnitude of the difference between the underlying asset or index and the strike price.

Accordingly, binary options are clearly within the category of derivatives with non-linear payoffs. For example, a binary call option at a strike price for the underlying asset of 75 would pay the same amount if, at expiration, the underlying asset price was at 76, 80, 85, 95 or any other price above 75.

In contrast, a standardized or exchange-traded call option in the money would pay different amounts based on each of those expiration prices, with the amounts increasing in a direct, linear relationship from the strike price.

Options are generally traded either OTC or on a national securities exchange registered with the Securities and Exchange Commission ("SEC") or on a contract market designated by the Commodity Futures Trading Commission ("CFTC"). A registered national securities exchange or designated contract market are hereinafter referred to collectively as "organized exchange." An instrument is described as trading OTC if it trades in some context other than on or through an organized exchange. OTC derivatives are understood to be specifically tailored to the needs and requirements of the end-user, and therefore, lack the standardization and transparency found on organized exchanges.

The majority of derivative products are traded OTC. In such a market, large financial institutions serve as derivatives dealers, customizing products for the needs of particular clients. Contract terms are negotiated between the parties, and typically each party has only their contra-party to look to for performance of the contract.

Binary options have been traded for some time in an OTC environment between institutional traders but not on a national securities exchange. Contract markets have offered "binary options" based on catastrophic events as well as on certain economic indexes such as the Consumer Price Index (CPI). In France, Germany and Austria, binary options have been traded OTC in a one-sided market between investors and an institution. The institution in these cases is the issuer of the contract and establishes, if applicable, the market for the binary option.

OTC binary options have several drawbacks and disadvantages. One disadvantage is that OTC binary options are typically offered by an institution on a non-fungible basis so that a customer can purchase the option only from the institution, and cannot easily resell to a third party because they are not standardized or traded on an exchange. As a result, OTC binary options, as compared to standardized exchange-traded options, lack important attributes of a trading market such as transparency and liquidity.

Figure 4:
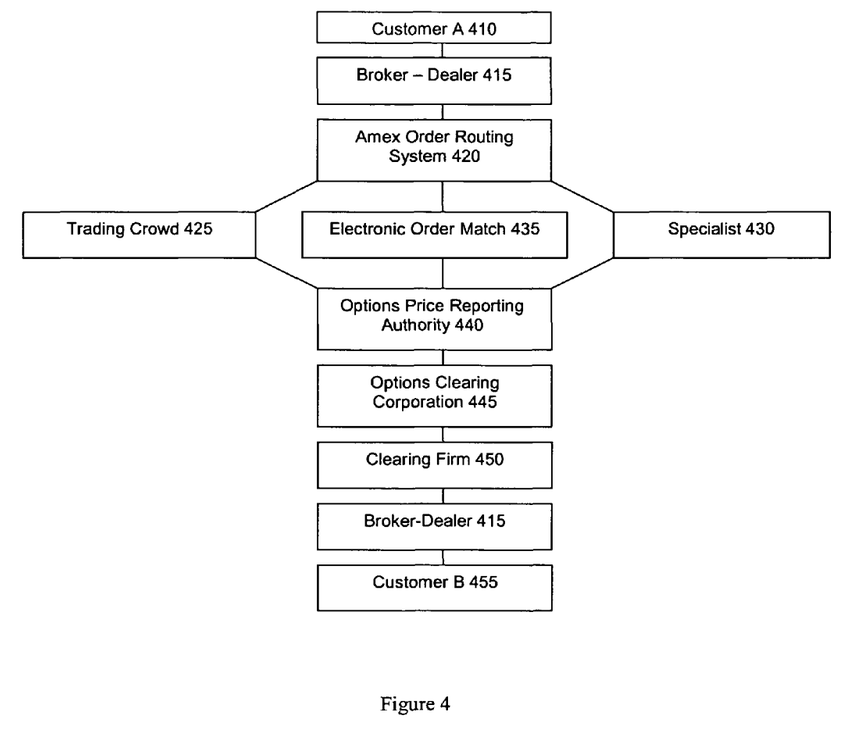
FIG. 4 illustrates an exemplary order routing and trading network on which embodiments of the fixed return options of the present invention may be traded.

An example of the organizational structure of an exchange such as those on which some options are currently traded is illustrated in FIG. 4. Customers 410, through their broker/dealers 415, can offer to buy or sell an option. Organized exchanges typically facilitate the trading of options through a combination of electronic systems for order routing 420, matching 435 and execution and/or floor-based auction trading conducted using an "open outcry" method, by which competing floor brokers representing public orders and market makers trading for their own accounts, make bids and offers on the trading floor. Typically, in the floor-based model, trading takes place at a "post" consisting of a "specialist" 430 or designated market maker and trading crowd 425. The American Stock Exchange ("Amex") employs a modified specialist system. The specialist post 430 is a specific location on the trading floor of the Exchange designated for the trading of a specific option class. Each option traded at a particular post is managed by an assigned specialist. A specialist is an Exchange member whose function is to maintain a fair and orderly market in a given option class. This is accomplished by managing the limit order book and making bids and offers for his own account in the absence of opposite market side orders, i.e. providing continuous two-sided markets. Other options exchanges have similar structures for trading options, whether electronic or on-floor.

By law, standardized equity options traded in the United States may only occur on a national securities exchange registered with the SEC. Options traded on national securities exchanges are generally traded based on an underlying equity or index meeting approved listing standards that have an appropriate pricing mechanism. For example, stock options are traded during the normal hours of operation of U.S. securities exchanges.

All standardized options in the United States are issued, cleared, settled and guaranteed by the Option Clearing Corporation ("OCC") 445. This organization is equally owned and supported by all U.S. options exchanges. The OCC is able to recognize, segregate, calculate and disseminate information from the various exchanges, and to facilitate the fungibility described above in large part due to the standardized symbology scheme detailed below. Systems for calculating delivery and payment amounts due between participating parties rely on this standardization.

Options that are traded on national securities exchanges are standardized, and therefore fungible through the use of identical contract terms (such as expiration cycles) and pre-defined parameters. For example, all non-FLEX exchange-traded securities options expire on the Saturday following the third Friday of any given month. The issuer of each option contract is the OCC regardless of where the option trades. A writer of a standardized option cannot create or choose a different expiration date. The writer cannot change or define any strike price, but for any given option, must select from a specific set of available strike prices. Similarly, not all expiration months are simultaneously available for all standardized option series.

One convention that is central to the standardization of options is an agreed-upon scheme by which all options exchanges assign and attach symbols. The convention allows for options to have symbols with a maximum of 5 characters. Each character has 26 possibilities, corresponding to the 26 letters of the alphabet. The first one, two or three characters (known as the root symbol) denote the underlying asset for the option. In some cases this corresponds exactly to the underlying asset's trading symbol, in other cases there is no relationship between the two. The next character/symbol denotes two pieces of information—whether the option is a put or a call, and the month of expiration. These codes are listed in table I. The final character denotes the strike price for the option. The strike price codes are listed in table II.

TABLE I

Expiration Month Codes
Next-to-last Character - Expiration Month Codes

| Month | Call | Put |
|---|---|---|
| January | A | M |
| February | B | N |
| March | C | O |
| April | D | P |
| May | E | Q |
| June | F | R |
| July | G | S |
| August | H | T |
| September | I | U |
| October | J | V |
| November | K | W |
| December | L | X |

TABLE II

Strike Price Codes
Last Character - Standard Strike Price Codes

| Code | Strike Prices |
|---|---|
| A | 5; 105; 205; 305; 405; . . . |
| B | 10; 110; 210; 310; 410; . . . |
| C | 15; 115; 215; 315; 415; . . . |
| D | 20. 120; 220; 320; 420; . . . |
| E | 25; 125; 225; 325; 425; . . . |
| F | 30; 130; 230; 330; 430; . . . |
| G | 35; 135; 235; 335; 435; . . . |
| H | 40; 140; 240; 340; 430; . . . |
| I | 45; 145; 245; 345; 435; . . . |
| J | 50; 150; 250; 350; 450; . . . |
| K | 55; 155; 255; 355; 455; . . . |
| L | 60; 160; 260; 360; 460; . . . |
| M | 65; 165; 265; 365; 465; . . . |
| N | 70; 170; 270; 370; 470; . . . |
| O | 75; 175; 275; 375; 475; . . . |
| P | 80; 180; 280; 380; 480; . . . |
| Q | 85; 185; 285; 385; 485; . . . |
| R | 90; 190; 290; 390; 490; . . . |
| S | 95; 195; 295; 395; 495; . . . |
| T | 100; 200; 300; 400; 500; . . . |
| U | 7½; 107½; 207½; 307½; . . . |
| V | 12½; 112½; 212½; 312½; . . . |
| W | 17½; 117½; 217½; 317½; . . . |
| X | 22½; 122½; 222½; 322½; . . . |
| Y | 27½; 127½; 227½; 327½; . . . |
| Z | 33; 133; 233; 333; 433; . . . |

Generally, there are several expiration months available for each equity option. Moreover, there are several strike prices available for each expiration month of each option. Therefore, for a single stock there are often several options series traded and it is not unusual to have 60 different options series available for a single stock or options class. Thus, it will be apparent that for each options class, there may be several option series, each of which are separately priced.

For example, assume PQR Corp. is a publicly traded stock with the trading symbol of "PQR" and an assigned options root symbol of "PQR." A typical option for this stock might be a PQR October 70 Call. A PQR October 70 Call option is a contract giving the holder the right to buy 100 shares of PQR Corp. stock at $70 per share until the third Saturday in October The symbol for this standardized option is PQRJN. Thus, by referring to the above symbology scheme, all interested parties recognize this symbol as denoting an option for the underlying asset PQR (derived from the first three characters in the symbol—PQR), which is a call option expiring in October (denoted by the "J"), with a strike price of 70 (denoted by the "N").

This five (5) character symbology is an industry-wide convention for the processing of standardized exchange-traded options contracts. Options that cannot be made to fit within the 5 character symbology cannot be exchange-traded, because current industry systems only recognize the 5 character symbology. Accordingly, the only non-FLEX exchange-traded or standardized options contracts tradable on U.S. securities exchanges until now have been the traditional calls and puts described above. All other option styles, including European-style binary options, have traded OTC, where systems and processes are more flexible and can be made to recognize and accept a vast scope of varying option contract terms, and where a symbology scheme does not exist to limit product scope.

For current standardized options, at expiration a determination is made as to whether the option expires in-, at-, or out-of-the-money. This is determined by establishing an agreed-upon definitive settlement closing price for the underlying security, which is compared to each strike price to determine if the settlement closing price was greater than, equal to, or less than the strike price. With current standardized options there are standardized procedures that are followed to determine the settlement closing prices. For example, for traditional put and call equity options, the OCC determines the settlement closing price by taking the last reported composite trade at the close of trading, i.e. 4:00 p.m. Eastern Standard time. For index options, the designated reporting authority (i.e. the index provider), as defined by the particular organized exchange, performs the necessary calculations to derive a settlement closing value and then transmits that value to the OCC 445. The OCC then compares the settlement closing value to existing strike prices to determine which options are in-, at-, or out-of-the-money. In the case of some index options, this value is calculated not by looking at any one price of any one index or security at any one particular time, but rather is derived by taking a volume weighted average price (VWAP) of underlying securities over a designated period of time.

Standardized call and put equity options traded on the options exchange require a holder to tender exercise instructions in order for the option to be exercise or not exercised at expiration. For the purpose of convenience, the OCC, as issuer, has implemented an "Exercise-by-Exception" procedure which will exercise an option without specific exercise instructions if the option is in-the-money by the exercise threshold amount or more. The exercise threshold amount is [$0.25] per share in-the-money for customer accounts and [$0.15] per share in-the-money for firm and market maker accounts. The exercise threshold amount effectively triggers an automatic exercise. The application of the "Exercise-by-Exception" procedure will occur in all cases except where a holder of an option delivers contrary instructions. Binary options or "Fixed Return Options"$^{SM}$ ("FRO"$^{SM}$ or "FROs"$^{SM}$) are automatically exercised under the terms of the contract, and therefore, the affirmative obligation to tender instructions as well as the "Exercise-by-Exception" procedure is unnecessary. This feature significantly differentiates FROs from traditional, exchange-traded options.

It has long been recognized that in order for a market to remain viable, participants must have a level of comfort and trust that they are transacting in a "fair" environment. Organized exchanges in the U.S. operate under specific legislative mandates to maintain "fair and orderly" markets. Since the adoption of the Securities Exchange Act of 1934, which created the SEC, particular focus has been paid to ensure that markets are not susceptible to manipulation. The SEC was created in part to stem the specific practice of "gaming" or manipulating stock prices such as was done by "short sellers" leading up to the stock market crash of 1929. Market fairness and integrity is a necessary underpinning of any market, as well as in the trading in any particular product or security upon any market.

The exact price at which any security closes on any given day can have important consequences. As discussed above, the closing price of an underlying security prior to expiration of an option has particular importance, as it is that value which dictates whether the option closes in, at or out-of-the-money. Accordingly, significant regulatory and surveillance efforts are employed by organized exchanges, self-regulatory organizations (SROs) and other regulatory bodies in an effort to detect, deter and eliminate potential manipulation of an underlying security that is near an option strike price at expiration.

Tremendous liquidity has been achieved in the exchange-traded options market, largely the result of standardization. The primary benefit of standardization and the reason for the tremendous liquidity is the interchangability or fungibility of option contracts regardless of where the option was originally executed. As a result, multiple contra-parties may exist. In the OTC markets, this benefit does not exist. In the case of multiply-listed or multiply-traded options (option classes listed and traded on more than one options exchange), standardization makes it possible to purchase an option contract on one exchange, and then sell it on another. Binary options have never been traded on a national securities exchange in a standardized form. There is a need in the art to provide liquidity in the binary options market, and there thus exists a need in the art for systems and methods for trading binary options on an exchange in a standardized form.

SUMMARY OF THE INVENTION

An embodiment of the invention generally relates to a binary option, herein referred to as a FRO financial product, and the systems and methods applied to enable the product to trade in standardized format on an organized exchange.

An embodiment of the invention generally relates to the unique use and adaptation of the five (5)-character maximum option symbology scheme, or any other adaptations of such options symbology scheme in the future, to allow for the recognition and differentiation of FROs or binary options from traditional exchange-traded options within that scheme, thus making possible the standardized trading, clearing, and settlement of FROs or binary options.

An embodiment of the invention generally relates to a specific method, uniquely applied, for calculating the closing settlement value of a security underlying a FRO or binary option, which method and application create necessary conditions for the trading of these instruments in standardized format on an organized exchange.

An embodiment of the invention is a method for trading fixed return options comprising listing a FRO in standardized form on an organized exchange, and clearing and settling the FRO using the same systems used on the exchange to clear and settle standardized, non-binary options. The method may further comprise the step of assigning symbols to the FRO that comply with the symbol conventions of standard exchange-traded options. The method may further comprise the step of processing transactions involving the FRO using existing trading, clearance, margin, and settlement systems based on the symbols assigned to the FRO. The method may further comprise the step of calculating the closing settlement value of a security underlying the FRO using a volume weighted average price (VWAP) of the security. In one embodiment, the VWAP of the security may be calculated over a pre-determined amount of time on the last regular trading day prior to expiration of the FRO. The method may further comprise the step of assigning a multiplier code for the FRO which provides information about the FRO for the systems used on the exchange to clear and settle standardized, non-binary options.

Another embodiment of the invention is a system for trading a FRO, comprising an electronic order delivery and execution system in an exchange-trading environment, wherein the same electronic order delivery and execution system used to execute transactions in and deliver the FRO is used to execute transactions in and deliver standard, non-binary options. The system may further include a means for assigning symbols to the FRO that comply with the symbol conventions of standard exchange-traded options. The system may further include a means for processing transactions involving the FRO using existing trading, clearance, margin, and settlement systems based on the symbols assigned to the FRO. The system may further include means for calculating the closing settlement value of a security underlying the FRO using a VWAP of the security. In one embodiment, the FRO may be traded through an on-floor auction in the trading crowd. The system may further include means for assigning symbols to the FRO that comply with the symbol conventions of standard exchange-traded options. The system may further include means for calculating the closing settlement value of a security underlying the FRO using a VWAP of the security. In one embodiment, a multiplier code for the FRO provides information about the fixed return option for the systems used on the exchange to clear and settle standardized, non-binary options.

Another embodiment of the invention is a computer program product for listing FROs on an exchange, comprising instructions for assigning symbols to the FRO that comply with the symbol conventions of standard exchange-traded options. In one embodiment, the symbols provide sufficient information for existing trading, clearance, margin, and settlement systems to process transactions involving the FRO based on the symbols assigned by the computer program product to the FRO. In one embodiment, a second computer program product computes a closing settlement value of a security underlying the FRO using a VWAP of the security. The second computer program product may include means for inputting data from an exchange or exchanges comprising the number of shares of the underlying security and the price of the underlying security for a predetermined amount of time before market close. The computer program product may comprise an instruction for assigning a multiplier code for the FRO that provides information about the FRO for the systems used on the exchange to clear and settle standardized, non-binary options.

DETAILED DESCRIPTION

For simplicity and illustrative purposes, the principles of the present invention are described by referring mainly to the embodiment as intended to be employed by the Amex. However, one of ordinary skill in the art would readily recognize that the embodiments of the invention are equally applicable to, and can be implemented in, many types of organized exchange processing systems, and that any such variations do not depart from the true spirit and scope of the present invention. Moreover, while in the following detailed description, references are made to the accompanying figures, which illustrate specific embodiments, changes may be made to the embodiments without departing from the spirit and scope of the present invention. The following detailed description is, therefore, not to be taken in a limiting sense and the scope of the present invention is defined by the appended claims and their equivalents.

An embodiment of the invention generally relates to the trading of a FRO financial product, i.e., a type of derivative security commonly known as a binary option, in a standardized format on an organized exchange. In one embodiment, the performance or payoff of the FRO financial product is based on the predicted performance of an underlying security over a predetermined amount of time. In various embodiments, the underlying security may be stock, security indexes, exchange-traded funds, bonds, commodities, or other types of financial instruments, assets or any other item of economic significance. FROs are unique compared to existing standardized options trading on national securities exchanges due to their non-linear, fixed amount payout structure. No existing standardized option currently trading on organized exchanges has such structure. Instead, existing standardized put and call options on securities have a linear payout structure linked to the difference between the option's strike price and the value of the underlying security.

Figure 5:
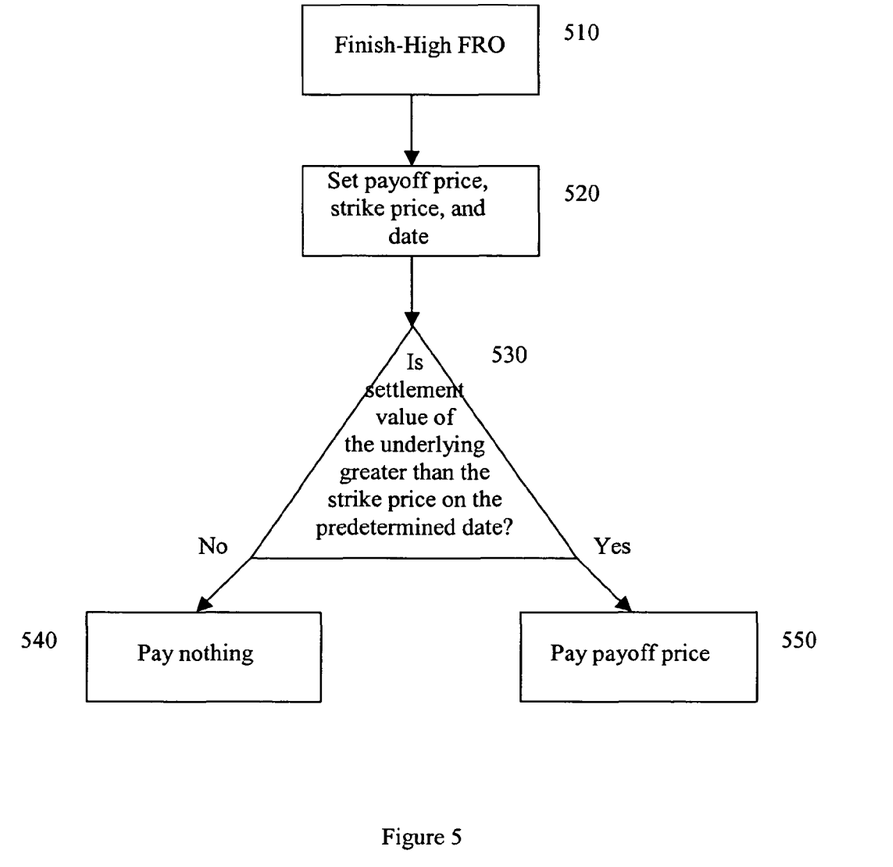
FIG. 5 is a flow diagram illustrating one example of the "Finish-High" embodiments of the invention.

In some embodiments, the FRO financial products of the invention have three broad types or classes of products based on the predicted performance of the underlying security. First, as illustrated in FIG. 5, "Finish-High"$^{SM}$ 510 is a class of FRO financial products in which the writer pays a predetermined amount of cash 550 when the settlement value of an underlying security exceeds a predetermined fixed value, i.e., strike price on a predetermined expiration date 530. If the settlement value is less than the strike price, the writer pays nothing 540. On or before the purchase of the "Finish-High" FRO, the predetermined payoff value, the strike price, and the expiration date are set (520).

Figure 6:
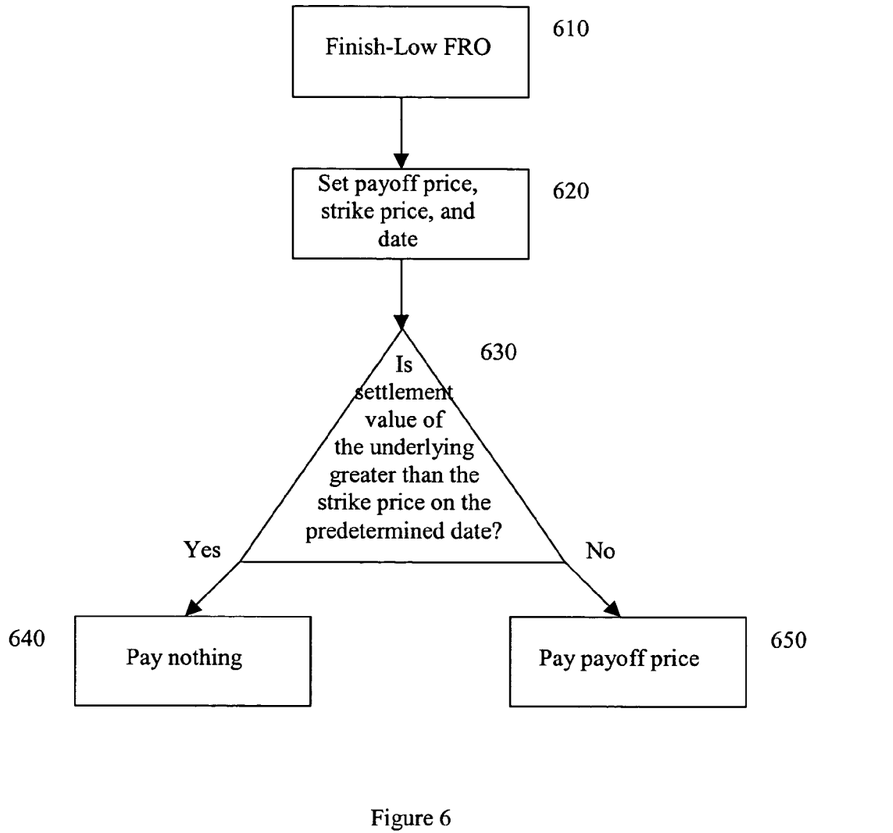
FIG. 6 is a flow diagram illustrating one example of the "Finish-Low" embodiments of the invention.

A second example of an embodiment of the FRO financial product class, illustrated in FIG. 6, is the "Finish-Low"™ FRO product 610. On or before the sale of the "Finish-Low" FRO, a predetermined payoff value, the strike price, and the expiration date are set (620). A writer of the "Finish-Low" FRO financial product pays a predetermined amount of cash (650) when the settlement value of an underlying security falls below the strike price on the expiration date (630). If the settlement price of the underlying security is greater than the strike price, the writer pays nothing (640).

Figure 7:
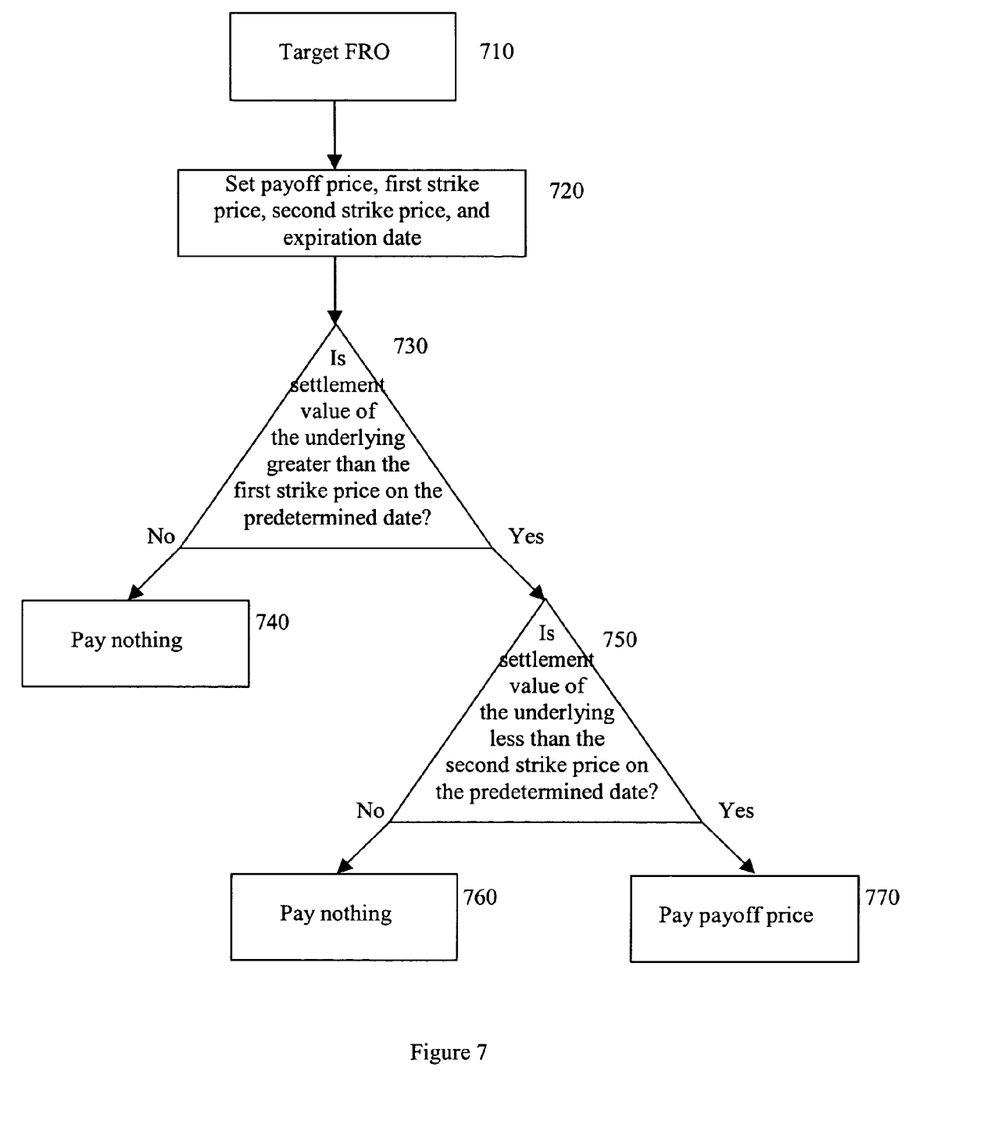
FIG. 7 is a flow diagram illustrating one example of the "Target" embodiments of the invention.

A third example of an embodiment of the FRO financial product class, illustrated in FIG. 7, is the "Target" FRO financial product 710. In this embodiment, the "Target" FRO financial product pays a fixed amount of cash when the settlement value of the underlying security is within a range of two strike prices at the expiration date. On or before the sale of the "Target" FRO, two predetermined strike prices, a first lower strike price and a second upper strike price, are set, along with the expiration date 720. If, on the expiration date, the settlement value of the underlying security is greater than the first strike price 730, and is less than the second strike price 750, then the writer pays the payoff price 770. If either of those conditions is not met, however, the writer pays nothing (740, 760).

In some embodiments, the strike prices for the FRO financial product may be quoted based on existing exchange-traded options intervals with a minimum price variation (MPV) expected at $0.05. The current MPV for standardized options is set by Exchange rule approved by the SEC to accommodate a finite trading capacity. While not limited to such, strike prices may be initially established at levels up to 10% to 20% above or below the price of the underlying security, e.g., a stock, exchange-traded fund share, trust issued receipt, index or the like. Such a limitation is practical to avoid creating options for which there would be very little demand because of the small likelihood that much greater price fluctuations would occur.

In one aspect of an embodiment of the invention, the OCC will issue and clear transactions in FROs as it currently does for all existing standardized options. As a result, the OCC will revise the Options Disclosure Document to include a description of FROs and amend its rules and by-laws to reflect the non-linear, fixed amount payout structure of FROs.

In order to allow the FRO financial product to trade on secondary markets, one embodiment of the invention is a method for listing the FRO financial product, and having the product recognized by the various systems used currently for the listing, trading, transmitting, clearing and settling of standardized options, including those systems utilized by the OCC. Systems used by the OCC and other parties to give proper routing and accounting treatment to particular financial products, such as systems that recognize various product types and calculate appropriate margin amounts for particular products, must be adapted to recognize the FRO instruments as separate and distinct. To that end, a mapping algorithm may be utilized to create symbols that represent the underlying security, the fact that the option is a binary option or FRO as opposed to a typical put or call option, the expiration date and the strike price, where the symbols are then listed for trading on an exchange. In some embodiments, a computer means may be used to execute the mapping algorithm to create FRO symbols.

Figure 8:
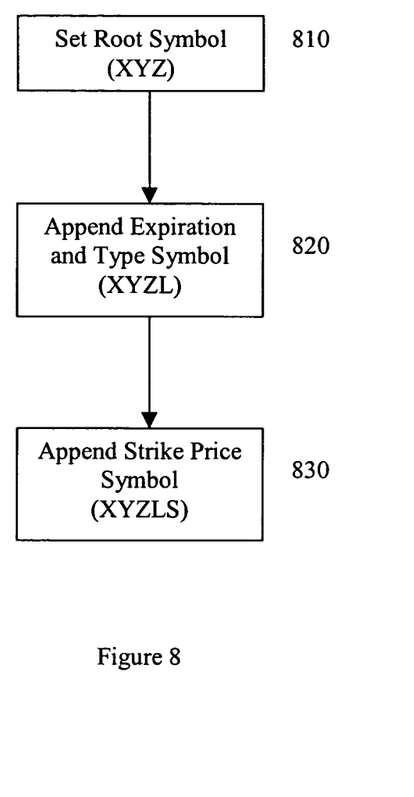
FIG. 8 is a flow diagram illustrating an embodiment of a method of the invention for assigning symbols to FROs.

As illustrated in FIG. 8, when implemented by an individual and/or a computer program, the mapping algorithm assigns a root symbol for the underlying security 810. The root symbol may comprise up to three characters. The root symbol will be unique, and specifically must be different from the root symbol for the non-FRO related to the same underlying asset. An expiration symbol is generated for the expiration date of the FRO product and concatenated to the root symbol 820. Subsequently, a strike price symbol is generated for the strike price for the underlying security and concatenated to the existing combination of the root symbol and expiration symbol 830. Thus, a new Finish-High FRO financial product, for example, with symbol "XYZLS" (where "XYZ" has been assigned as a root symbol defining "FRO root for underlying asset PQR") will now be recognized as a standardized binary option—specifically the PQR December 95 Finish High. In this embodiment, the "XYZ" characters in the FRO symbol denote two elements of the instrument—that the instrument is a FRO as well as the underlying asset.

In one embodiment, the mapping algorithm may be implemented as a computer program module to be integrated with an existing exchange, e.g., the Amex. In other embodiments, the expiration symbol and strike price symbols utilize the existing option contract symbol library for their respective symbol. It is within the scope of the invention that other symbol libraries may be used for the root, expiration, and strike price symbols. For example, in the case of the "Target" FRO, a new library of barrier ranges may be defined to correlate to the 26 character choices for the last strike price character in the traditional five (5) character symbol chain.

More specifically, in one embodiment, the symbology scheme for the last two characters of standardized exchange traded options is set forth in Table III (below) and Table II (above), respectively.

TABLE III

Expiration Month Codes
Next-to-last Character - Expiration Month Codes

| Month | Finish High | Finish Low |
|---|---|---|
| January | A | M |
| February | B | N |
| March | C | O |
| April | D | P |
| May | E | Q |
| June | F | R |
| July | G | S |
| August | H | T |
| September | I | U |
| October | J | V |
| November | K | W |
| December | L | X |

In yet other embodiments, the "Finish High" FRO financial product is processed as a call option and the "Finish Low" FRO financial product is processed as a put option. In other embodiments involving a "Target" FRO, the root symbol may indicate that the option is a "Target" FRO, the identity of the underlying security, and the expiration month. This leaves the remaining two characters to indicate the lower and upper strike prices.

A benefit of the FRO financial product is that the purchaser and writer of the FRO financial product know the expected return at the time of purchase if the underlying security performs as expected. In contrast, the "traditional" option does not typically have a known return at the time of purchase, i.e., the return cannot be accurately determined until the option is nearing expiration due to price movements. In addition, because the return on the FRO financial product is a "fixed amount," a buyer of the FRO financial product does not need to determine the absolute magnitude of the underlying security's price movement relative to the strike price as is the case with traditional options. Yet another benefit of the FRO financial product is the limited risk/return to the writer/purchaser because of the payout being a fixed dollar amount.

A systemic benefit provided by the FRO financial product versus their OTC binary option counterpart is that standardized clearing and settlement systems may be programmed to recognize FROs based on their unique underlying symbols and segregation for particular treatment by systems used for calculating permissible margin as well as final payout amounts due at settlement. Thus, existing clearing and settlement systems may easily be adapted to handle transactions in FROs without any structural changes to the systems, and with only minimal effort.

In various embodiments of the invention, the fixed return amount for FROs may be set for all FROs at some standard price. For example, the fixed return amount in cash for all such options may be fixed at $100.00, but the price of the options will vary according to the supply and demand forces of the marketplace.

In some embodiments of the invention, the multiplier of the FRO may be 100 as with traditional standardized options. With respect to traditional options, the 100 multiplier indicates that 100 shares of the underlying security are represented by a single option. As a result, the quoted price is multiplied by 100 to derive the actual contract purchase price or premium in dollars. While the payoff amount of FROs will not necessarily depend on this multiplier like standard options' payoff amounts do, it may be convenient to adopt the standard 100 multiplier in order to more easily adapt existing options trading systems to trading in FROs. In other embodiments of the invention, the FRO financial product may employ a different multiplier that the existing convention of "100." In these embodiments, the systems and processes for trading conventional options may then simply use the different multiplier code as an additional or distinct method for identifying options as FROs and, therefore, segregating them for appropriate routing and processing.

In one embodiment of the invention, a different processing method may be utilized for calculating the "closing" or "settlement" price of the underlying asset than that used for typical exchange-traded options with the same underlying asset. Thus, whereas typical exchange-traded equity options have a settlement price determined by the OCC based on a "composite price," i.e., the last reported sale price of the security during regular trading hours, the settlement price for FROs may be based on either the OCC's composite price, or on some other measure of the price of the underlying asset.

Thus, in some embodiments of the invention, calculation of a volume weighted average price (VWAP) for the underlying asset over some designated time period (e.g. the last 15 minutes of trading) may be utilized to calculate and disseminate a discrete closing or settlement value for the FRO financial product. This embodiment protects against any potential price manipulation that could occur at expiration motivated by the non-linear or "all-or-nothing" nature of FROs. Thus, whereas the standard composite pricing mechanism used by the OCC is subject to manipulation by unscrupulous options traders by last-minute, small volume trading, the VWAP pricing mechanism makes it much less practical to manipulate the price of the underlying securities in order to meet the strike price.

Calculation of the VWAP may be accomplished using the following algorithm, for example, a computer means with pricing inputs from one or more exchanges or markets. An amount of time prior to the market close at expiration is selected, for example, 15 minutes. During that time, each transaction involving the underlying security is recorded as a number of shares sold and a selling price for those shares. For each transaction involving the underlying security during the preselected time, the number of shares is multiplied by the selling price for those shares to calculate a transaction price. The transaction price for each transaction involving the underlying security during the preselected time is added, and the total is divided by the total number of underlying securities sold during the preselected time:

$$VWAP = \frac{\sum_i n_i P_i}{\sum_i n_i}$$

where $n_i$ is the number of shares of the underlying sold in transaction i (which occurred during the predetermined time before market close), $P_i$ is the price of those shares, and the index i includes all transactions involving the underlying security during the preselected time before market close. In one embodiment, the VWAP settlement price may be disseminated by the exchanges that list the FRO as the official settlement price for the FRO, and may be made publicly available through various market data vendors as well as on the exchanges' websites. In one embodiment, certain trade types reported during the VWAP period, such as "out-of-sequence" trades, may be excluded from the VWAP calculation.

In yet another embodiment of the invention, where processing systems have distinct fields for identifying product types, product classes; or product codes, or for identifying product sub-types, sub-classifications or sub-codes for segregating and various distinct processing of different products, a unique product type, class, code or any other unique identifier may be attached to FROs so that they may be recognized as such by systems and individuals for appropriate processing.

We claim:

1. A method comprising:
    assigning symbols to a fixed return option that comply with the symbol conventions of standard exchange-traded options,
    listing and trading, by a computer, the fixed return option in standardized form on an organized exchange,
    processing transactions involving the fixed return option using existing trading, clearance, margin, and settlement systems based on the symbols assigned to the fixed return option,
    calculating, by a computer, the closing settlement value of a security underlying the fixed return option using a volume weighted average price of the security,
    clearing and settling, based at least in part on the calculated closing settlement value, the fixed return option using the same electronic systems used on the exchange to trade, clear and settle standardized, non-binary options and
    wherein the volume weighted average price of the security is calculated over a pre-determined time period on the last regular trading day prior to expiration of the fixed return option.

2. The method of claim 1, wherein a multiplier code for the fixed return option provides information about the fixed return option for the systems used on the exchange to clear and settle standardized, non-binary options.

3. A system for trading a fixed return option, comprising:
    an electronic order delivery and execution system in an exchange-trading environment, wherein the same electronic order delivery and execution system used to execute transactions in and deliver the fixed return option is used to execute transactions in and deliver standard, non-binary options,
    the system including computer means for assigning symbols to the fixed return option that comply with the symbol conventions of standard exchange-traded options and computer means for processing transactions involving the fixed return option using existing trading, clearance, margin, and settlement systems based on the symbols assigned to the fixed return option, and
    the system further comprising computer means for calculating the closing settlement value of a security underlying the fixed return option using a volume weighted average price of the security.

* * * * *